Feb. 25, 1941.   A. G. PETERKIN ET AL   2,232,727
REACTION OF SOLUTIONS
Filed March 15, 1938   2 Sheets-Sheet 1
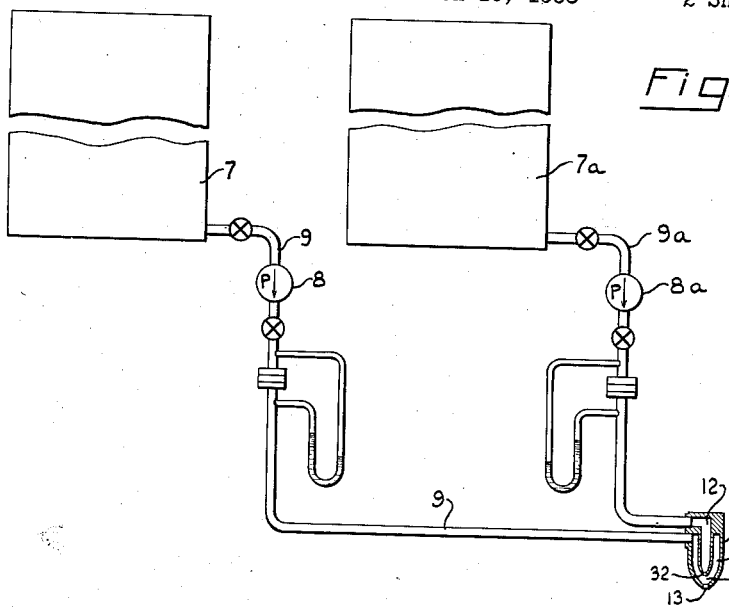
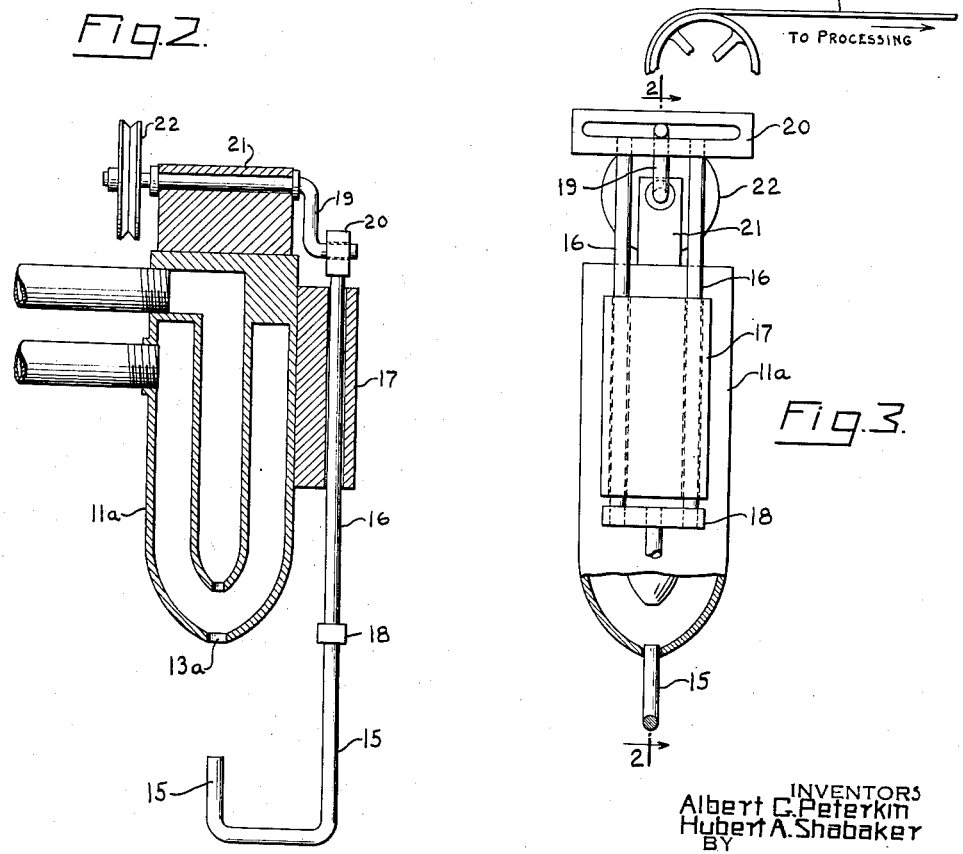
INVENTORS
Albert G. Peterkin
Hubert A. Shabaker
BY
Ira L. Nickerson
ATTORNEY

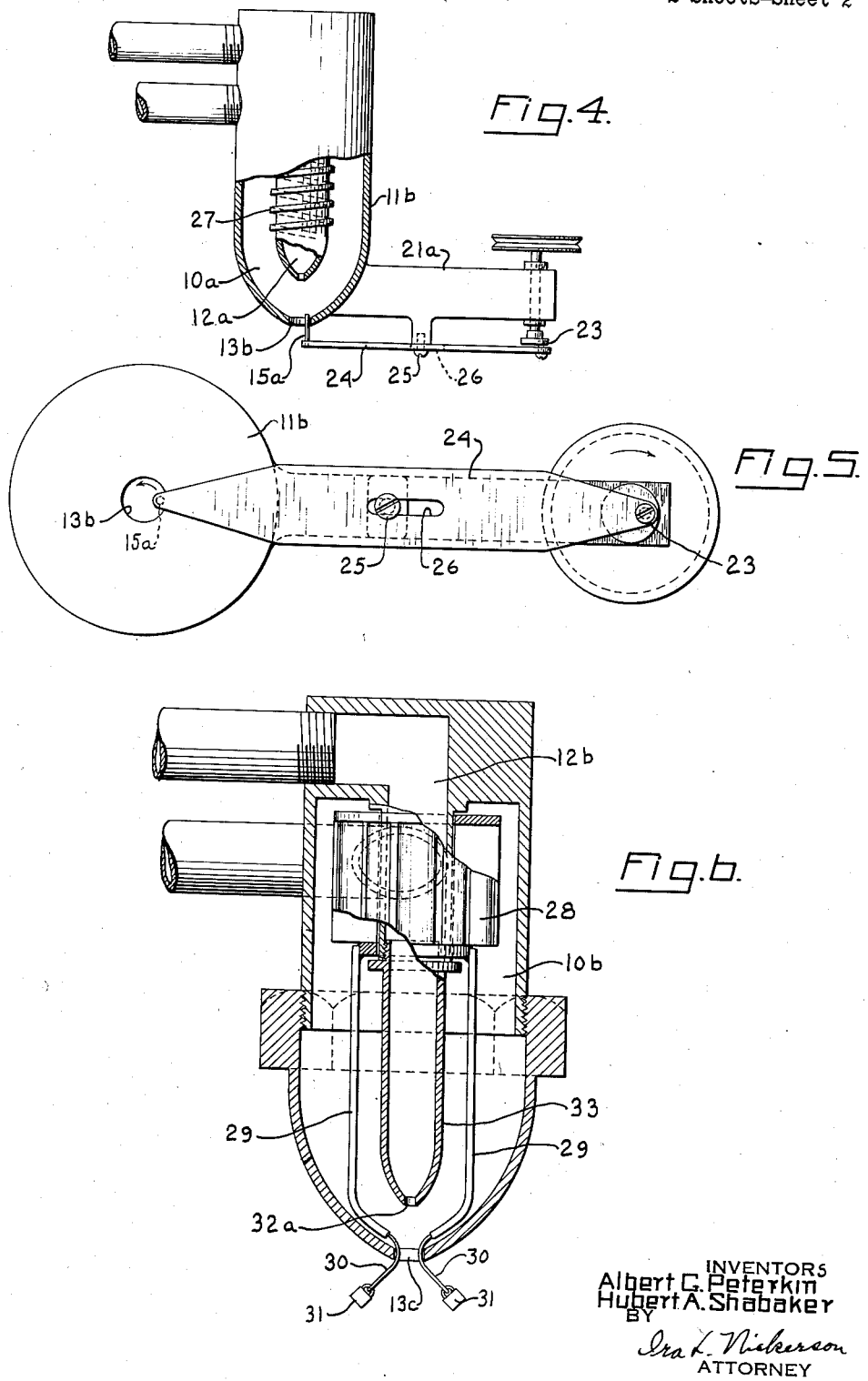

Patented Feb. 25, 1941

2,232,727

UNITED STATES PATENT OFFICE 2,232,727

REACTION OF SOLUTIONS

Albert G. Peterkin, Bryn Mawr, and Hubert A. Shabaker, Media, Pa., assignors to Houdry Process Corporation, Wilmington, Del., a corporation of Delaware Application March 15, 1938, Serial No. 195,988

21 Claims. (Cl. 23—110)

The present invention relates to the production of solids from reactant solutions. It deals particularly with improved methods and apparatus for continuous manufacture of such products and is of particular value in the formation of viscous or stiff masses such as gels or gelatinous precipitates which may be further processed, if desired, to reduce the same to hard or rigid forms.

Many products of the above class are known to be highly adsorptive, and, for this reason, have been valuable in chemical industry as or in contact masses for the chemical, catalytic or other treatment of fluids. It has been emphasized repeatedly in publications relating to the development of such products that they must be prepared under carefully selected and controlled reaction conditions, including type and proportions of reactants, and alkalinity, acidity or pH value of the mixed reactants, in order that the desired properties may be fully developed in the resulting products.

Continuous methods capable of producing a viscous or stiff product, such as an all embracing gel, under the desired closely controlled conditions have been proposed. Such methods, however, in order to avoid rapid clogging of the mixing and auxiliary equipment have involved delay or retardation of the setting and gelling reactions until after the mixed reactants had entered or were entering a quiescent setting or receiving receptacle or zone. This result could be practically achieved only by use of reactant solutions in such dilute form that gel formation did not take place for some time after their contact. Consequently, the final dried product could be obtained only after incurring the considerable and sometimes nearly prohibitive expense of evaporating excessive quantities of water from the resulting dilute gel. By accepting imperfect mixing of the reactants at the instant of their contact, as by quiet combination or coalescing of relatively low velocity streams of the same, and by subsequently improving the mixing while the combined streams were in transit to the receiving or setting receptacle, with or without the aid of baffling surfaces, slightly more concentrated solutions could be used with a limited degree of success. When the reactant solutions, however, were of such concentrations that formation of solid reaction product or substantial thickening of the combined solutions took place substantially at the instant of contact, adherent gelatinous deposit accumulated on the mixing and auxiliary equipment so rapidly that flow through the equipment was seriously restricted even to the point of complete or substantially complete stoppage within very short periods. Furthermore, such practice yielded prematurely formed product at the interface of the combined streams and under uncontrolled and unpredicted reaction conditions, thus tending to nullify the effect of their careful regulation. The final product was then not only non-uniform, but substantial portions and even practically all of it were made under conditions which were at best only a rough approximation of those desired.

One object of the present invention is continuously and economically to make reaction products of the type described from concentrated reactant solutions. Another object is to maintain close control over the reactions during their entire course. Another object is to yield a uniform reaction product. Another object is to provide apparatus capable of continuous and efficient service in effecting the above objects for extended periods. Other objects will be apparent from the detailed description which follows.

The invention involves continuously contacting within an enclosed mixing or reaction zone, streams of reactant solutions of such predetermined concentrations and proportions that a viscous, stiff or jelly-like product is quickly formed, and under such conditions of high velocity and interfering flow that each stream becomes disintegrated by violent mutual contact and is completely and uniformly dispersed or diffused within and throughout the other at substantially the instant of that contact. Within a second, the resulting uniform mixture, within and throughout which the gel forming reaction or reactions have been initiated under the predetermined conditions and have progressed so far toward completion under those conditions that at least a viscous suspension of the product and often a complete or substantially complete stiff and all-embracing gel has formed, is discharged from the mixing zone or chamber directly into a receiver. The best results and operation are usually realized when the streams of fluid are moving into and through the mixing zone at such high velocity that the above described viscous or stiff product is ejected from that zone within a small fraction of a second after the instant of impact of the individual solutions, as within a quarter, a tenth, or even within one-hundredth of a second of the impact.

In some instances, and especially when the reactant solutions are so concentrated and are contacted in such proportions that the stream issuing from the mixing chamber is a completely or substantially completely formed all-embracing gel, small amounts of an adherent, gelatinous deposit accumulate on the walls of that chamber, usually adjacent and/or within the discharge orifice or opening. This accumulation tends to interfere with or impede ejection of the product. According to one aspect of the invention, such accumulated deposit may be removed periodically or continuously, as desired, without interrupting operation of the mixing equipment. One of the streams of reactants entering the mixing zone may be utilized to effect removal of such deposit from the path of partially reacted mixture leaving the mixing zone while simultaneously modifying the conditions of turbulence within that zone.

Concrete embodiments of the invention are disclosed in the accompanying drawings, in which:

Fig. 1 is a somewhat diagrammatic flow chart in which one suitable type of mixing device is illustrated in sectional elevation;

Fig. 2 is a sectional elevation taken substantially on line 2—2 of Fig. 3 showing on an enlarged scale a mixing nozzle of the general type illustrated in Fig. 1 equipped with one type of cleaning device;

Fig. 3 is a side elevational view of Fig. 2 with a portion of the cleaning device broken away and showing the discharge end of the mixing nozzle in section;

Fig. 4 is a view, shown partly in elevation and partly in section, of a slightly modified mixing nozzle equipped with a different cleaning device;

Fig. 5 is a bottom plan view of Fig. 4 on an enlarged scale;

Fig. 6 is a view partly in vertical section and partly in elevation, illustrating further modification of the mixing nozzle and a still different type of cleaning device.

In Fig. 1, one reactant solution which may, for example, enter into the formation of a zeolitic gel or precipitate containing 5% or upwards by weight of insoluble oxides and may be a solution containing alumina, as a soluble aluminate or aluminum salt, supplied by tank 7 is forced or fed under pressure by pump 8 through valved line 9 containing a suitable metering device such as a calibrated orifice equipped with a manometer, as diagrammatically illustrated, and into a mixing device adapted to effect rapid and efficient mixture of fluids flowing at high velocity as, for example, into the outer and annular chamber 10 of mixing nozzle 11. A stream of another reactant solution which may, for example, contain silica in soluble form, is continuously and simultaneously supplied by tank 7a, pump 8a forcing the solution under pressure through line 9a and into the mixing nozzle 11, as into inner passage or chamber 12. The outer and annular rapidly moving stream of fluid enters mixing chamber M and converges toward outlet orifice 13, while the inner stream of reactant solution is violently driven or injected as a confined high velocity stream into the fluid traversing chamber M. The resulting sudden and forceful impact of the two solutions causes breaking up of each into an extremely fine state of subdivision (the individual particles practically instantaneously formed from each stream often approaching colloidal dimensions) and provides immediate, thorough and uniform comixture of the finely divided particles. With the type of mixing nozzle illustrated in the drawing, it is preferable that the discharge orifice for the inner stream of reactant solution, such as orifice 32, be substantially in axial alignment with the discharge opening or orifice, such as orifice 13, for partially reacted mixture leaving the mixing zone. Thus, the high velocity flow directly from inner orifice 32 tends to exert scouring and cleaning action on the walls of orifice 13. It is preferable also that the inner solution passageway or chamber 12 be of substantially larger diameter than orifice 32 thereby to minimize pressure drop through the mixing nozzle.

Within a fraction, and preferably a small fraction of a second, the completed and partially reacted mixture is discharged from mixing nozzle 11 directly into a suitable receiver, a continuous travelling belt such as that indicated at 14. This mixture is then ready for any desired subsequent treatment such as drying, washing and/or other suitable chemical or physical treatment to yield the finished product. To this end, belt 14 may convey the coagulum or the like to and/or through known or desired equipment adapted to effect the desired processing or treatment.

Although the mixing nozzle illustrated in the drawing is of the concentric type, it is to be understood that the invention is not limited to this specific form or type of mixing device. Other types of mixing equipment suitable for practice of the invention include, for example those wherein the reactant solutions enter a mixing chamber from diametrically opposed or angularly arranged inlets, the only requirements of the mixing device being that the reactant streams contact one another under such conditions of high velocity and turbulent flow that the aforedescribed substantially immediate, thorough and uniform mixing be effected, and that the mixing chamber or zone be of such small volume with respect to the volume of fluid flowing into and through it that such fluid remains in the mixing zone for the required short period of time.

The small amounts of adherent deposit which may accumlate within and/or adjacent the discharge orifice of the mixing device such as in discharge orifice 13 of nozzle 11 may be removed by a pin or other suitable member insertable into that orifice and preferably mechanically operated to provide scraping, wiping or other desired motion of such member. In the embodiments illustrated in Figs. 2 and 3, a reciprocating pin 15 may be periodically thrust into and removed from discharge orifice 13a of mixing nozzle 11a at desired intervals. The reciprocating motion may be provided by a suitable cam or crank and rod assembly. To this end, cleaning pin 15 may be attached to a suitable guide rod assembly such as rods 16 extending through guide block 17 and joined by lower cross member or yoke 18. This guide rod assembly may then be driven by crank 19 which is in engagement with and received by upper and slotted cross member or yoke 20. It is preferable that the reciprocating portions of, and, if desired, the entire assembly be attached to or mounted on mixing nozzle 11a in order to provide for and maintain better alignment of the reciprocating pin 15 with respect to the discharge orifice. As shown, this may be effected by attaching guide block 17 and bearing block 21 to the side and top walls respectively of the mixing nozzle. The best cleaning action is obtained, of course, when pin 15 is of such size that a rather close sliding fit in the orifice is realized. Thus, when the pin is within the latter the flow of fluid from the mixing zone is temporarily restricted to substantial extent, thus tending periodically to lengthen the time of contact within the mixing chamber and upsetting efficient operation of the nozzle. These disadvantages are practically eliminated, however, and smooth operation and, for all practical purposes, substantially continuous removal of adherent deposit result when pin 15 is reciprocated at comparatively high speeds as, for example, upwards of 120 times a minute and preferably at least 300 times a minute, through the use of a continuous drive device such as suitably driven pulley 22.

Figs. 4, 5 and 6 illustrate cleaning devices so designed and arranged that periodic stoppage or impedance of flow from the mixing nozzle is avoided. In Figs. 4 and 5, a cleaning member such as pin 15a is connected to a rotatable eccentric such as disc and bolt assembly 23 by a reciprocating linkages such as 24. As shown, this linkage may be pivoted, for example, at a point intermediate the cleaning pin and eccentric as by means of bolt 25 inserted through slot 26. With this type of cleaning device, which also is preferably mounted on mixing nozzle 11b as by means of bearing and supporting block 21a, pin 15a may be caused continuously to follow a path or orbit within discharge orifice 13b and preferably adjacent the periphery of the same so that the pin contacts all portions of the orifice wall. During operation of this device each portion of the surfaces of both the pin and the orifice walls is contacted or wiped by a portion of wall surface in one revolution of the pin within its orbit. Thus, both the walls of the orifice and of the pin are kept free of adherent deposit by mutual wiping action.

In some instances it is desirable, in order to accelerate the mixing of the reactant solutions, to impart a whirling or rotary motion to one of the streams entering the mixing chamber as, for example, to the outer or annular stream when a concentric mixing nozzle is utilized. The conditions of turbulent flow of such a stream may be modified in this manner by the use of vanes or the like extending from a wall of the annular chamber as, for example, by helical vanes or screw threads 27 extending into annulus 10a from walls of the inner solution chamber 12a of the mixing nozzle shown in Fig. 4. In Fig. 6, a rotary motion is imparted to the fluid in annular chamber 10b by rotation of a suitable member rotatable by the action of a flowing stream of fluid such as turbine 28 driven by the stream of fluid entering the annulus 10b. As shown, turbine 28 may turn around the walls of inner solution chamber 12b and may be held in position by a flanged member such as extension 33 containing orifice 32a. In order to attain maximum speed of rotation of turbine 28, the selected reactant fluid may enter chamber 10b tangentially, as indicated. Attached to the frame of turbine 28 are bent rods 29 projecting toward the discharge orifice and preferably terminating adjacent the same. Extending through the discharge orifice and attached to rods 29 are flexible cleaning members such as cables 30 having weights 31 depending therefrom. Upon rotation, weights 31 pull cables 30 against the walls of orifice 13c so that they exert a vigorous cleaning action thereon. It is evident, therefore, that the fluid entering annular chamber 10b is utilized to modify the conditions of turbulence within the mixing zone and to provide continuous cleaning of the orifice walls. Bent rods 29 also serve to some extent to remove deposit which may accumulate on the inside walls of the mixing chamber.

Application of the invention is illustrated in the following examples:

*Example 1*

An all embracing gel containing silica and alumina was prepared by continuously feeding high velocity substantially solid streams of concentrated solutions of commercial aluminum sulphate and commercial sodium silicate at approximately equal rates through the inner and outer solution chambers respectively and into the mixing zone of a mixing nozzle of the general type disclosed in Fig. 1 and equipped with a reciprocating pin cleaner of the type illustrated in Figs. 2 and 3. The aluminum sulphate solution contained about 56 grams of $Al_2O_3$ per liter, the silicate solution about 255 grams $SiO_2$ per liter and the immediately formed homogeneous mixture of these solutions passed through the mixing chamber at such velocity that it remained therein for only about 0.006 second. Within that time the formation of the uniform all embracing gel was carried substantially to completion, the high velocity stream of which continuously ejected from the mixing nozzle and directly into a receiver formed within the latter a stiff body of irregular outline. The continuous production of the gel was effected until the supply of reactant solutions was exhausted, or for a period of about an hour, during which time the cleaning pin was reciprocated at a rate of about 300 strokes per minute. At the end of this operation period the nozzle was dismantled and inspected. It was found to be reasonably free of adherent deposit and capable of uninterrupted use for extended periods.

The above mentioned stiff, rapidly formed gel which contained about 14.5% by weight of the insoluble oxides, silica and alumina, zeolitically holding sodium oxide was dried and washed free of soluble salts. The resulting porous and highly adsorptive blend of silica and alumina was capable of efficient use as a water softening agent. After removal of substantially all its alkali metal content, as for example, by treatment with a solution of ammonium chloride or ammonium sulphate substantially after the manner described in the copending application of John R. Bates, Serial No. 170,648 filed October 23, 1937, it was found to possess high activity in the production of lower boiling hydrocarbons, including those within the gasoline boiling range from higher boiling oils and tars in a recurring operation cycle involving alternate periods of transformation of the hydrocarbon charge and of regeneration of the contact mass in situ by combustion of burnable deposits formed thereon and therein during the transformation periods. This blend of silica and alumina was also valuable as a catalyst for condensation and polymerizations of hydrocarbons and/or as a support for other added catalytic agents, such as metals and metal oxides capable of removing sulphurous and other impurities from hydrocarbons or of promoting oxidation, hydrogenation, reduction, dehydrogenation, dehydration, esterification, purification and other reactions in the organic and inorganic fields of chemical industry.

*Example 2*

Another highly adsorptive blend of silica and alumina capable of use as or in contact masses having a high degree of chemical and/or catalytic activity was prepared by coagulation of a silica and alumina containing sol with a solution of ammonium chloride substantially after the manner disclosed in the copending application of John R. Bates, Serial No. 174,966, filed November 17, 1937. To this end, a sol containing about 1.25 mols of silica and approximately 0.105 mol of alumina, respectively, per liter was prepared by mixing solutions of commercial water-glass and of commercial sodium aluminate. A stream of this sol was fed through the outer solution chamber and into the mixing chamber of a nozzle of the type utilized in Example 1, while a continuous high velocity stream of about 23.5% ammonium chloride solution was simultaneously fed through the inner chamber of the mixing nozzle. The flow rates of the individual reactants were such that the sol and ammonium chloride solution entered the mixing zone in the respective volumetric ratio of about 2.3:1 and the resulting immediately formed homogeneous mixture was ejected from that zone in about a hundredth of a second. As in Example 1, the reacted mixture, continually issuing from the mixing nozzle, was already in the form of an all embracing gel. A reciprocating cleaning member was utilized in substantially the same manner as described in Example 1. From time to time the mixing nozzle was inspected and found to be clean.

After drying and washing the coagulum or all embracing gel, which contained about 6% by weight of silica and alumina, it was found to possess good activity in the transformation of high boiling hydrocarbons into lower boiling hydrocarbons of high anti-knock rating and in the improvement of the octane rating of low anti-knock naphthas.

*Example 3*

A solution of commercial sodium silicate containing approximately 1.6 mols of silica per liter was continuously charged to the outer chamber of a mixing nozzle of the type used in Examples 1 and 2 and equipped with a rotatable cleaning pin of the type described in connection with Figs. 4 and 5, while another solution containing about 0.042 mol per liter of $TiO_2$ and of the order of 0.095 mol of $Al_2O_3$ in the form of dissolved commercial grades of ammonium alum and titanium oxilate was continuously fed through the other solution chamber of the nozzle. The feed rates of the individual solutions were approximately equal and were such that the partially reacted mixture left the nozzle within one-tenth of a second of its formation. This partially reacted mixture comprising a polysilicate containing the oxides of aluminum and titanium issued from the mixing nozzle as a highly viscous suspension of amorphous solids and set up in about 5 seconds to form an all embracing gel containing about 6% by weight of insoluble oxides. Upon drying and washing, an adsorptive porous solid was formed which exhibited high catalytic activity in the transformation of higher boiling hydrocarbons into high anti-knock gasoline and which was valuable for use as a catalyst in many commercial contact processes.

It is to be understood that the invention is not limited to the production of compounds having the specific compositions or concentrations illustrated in the detailed examples given above. On the contrary, the invention finds application and is valuable in the manufacture of a great diversity of products. For example, as a partial list of products which can advantageously and economically be made in highly concentrated form according to the invention, there may be mentioned all-embracing gels or gelatinous precipitates occurring as single, plural or multi-component blends, mixtures or combinations containing elements occurring in Groups I to VIII of the periodic table, or compounds of such elements such as silica, alumina, ferric oxide or hydroxide, chromium, zirconium, tungsten or titanium oxides, whether such products be made alone, in admixture, or in chemical combination with the same or other elements, their oxides or other compounds, as for example the oxides of nickel, cobalt, copper, sodium, potassium, lithium, manganese, caesium, rhubidium, calcium, magnesium, strontium, boron, tin, cerium, vanadium, molybdenum, etc.

As indicated herein, products resulting from practice of the invention are especially valuable as starting materials for the production of contact masses used in the chemical, catalytic and other treatment of fluids. In dried form, such products possess to a high degree the adsorptivity which is characteristic of materials of this general class. The practically instantaneous production of uniform dispersion of the individual reactants, each within and throughout the other, insures initiation and procedure to completion of the reaction under closely controlled and predetermined conditions. As a result, the reaction products are characterized by uniformity, not only of composition, but also of presentation of adsorptive surfaces or areas, and, when the product contains differing individual components which provide selectively adsorptive or catalytically active molecular interfaces, such interfaces, each having substantially the same influence, are uniformly distributed within and throughout the entire structure of the gel or coagulum. Also, these superior products are obtained, by the use of mixing equipment capable of uninterrupted service for extended periods and which is small, cheaply fabricated, installed and operated, in such highly concentrated form that the substantial costs of making large quantities of dried finished product are drastically reduced.

By the term "all embracing gel" as used in the foregoing description and examples and in the appended claims is meant a gel made from solutions of such concentration and character that upon its formation there is substantially no free non-included water present. In other words, the gel embraces or includes all or substantially all the water in said solutions.

We claim as our invention:

1. In the preparation of inorganic gels or jelly-like masses by interreaction of solutions, the steps comprising feeding under pressure into an enclosed reaction chamber separate high velocity confined streams of solutions of such concentration and character that upon mixing they react practically immediately to form an all-embracing inorganic gel, contacting and mixing said streams within said chamber under such conditions including confined high velocity flow that great turbulence and substantially instantaneous thorough mixture and gel formation are produced, and within a fraction of a second of said mixing ejecting the resulting uniform gelatinous product from said chamber.

2. In preparing inorganic gelatinous materials the process comprising feeding under pressure into an enclosed reaction chamber separate high velocity confined streams of solutions of such concentration and character that upon mixing they react practically immediately to form an inorganic all-embracing gel, inducing rotary motion in one of said streams, contacting and mixing the rotating stream and the other stream within said chamber under such conditions including high velocity flow that great turbulence and substantially instantaneous thorough mixture and gel formation within and throughout the mixture are produced, and regulating the flow of said streams into said chamber to eject the resulting gelatinous product therefrom by said flow within a fraction of a second of said mixing.

3. In preparing silicious gels the process comprising simultaneously feeding under pressure into an enclosed reaction chamber in substantially concentric relation a confined stream of soluble silicate solution and a confined stream of a solution which will react with said silicate to form a gel, said solutions being of such concentration and in such proportion that upon mixture they react substantially immediately to form a gel having substantially no non-included water present, contacting and mixing said streams in said chamber under such conditions including confined high velocity flow that great turbulence and substantially instantaneous thorough mixture and gel formation within and throughout the mixture are produced, and regulating the flow of said streams into said chamber to force the resulting gelationous reaction product therefrom within a second of said mixing.

4. In the formation of gels containing silica and alumina, the process comprising simultaneously feeding under pressure into an enclosed reaction chamber a high velocity confined stream of solution containing a soluble silicate and a high velocity confined stream of a solution of a soluble compound of alumina in such proportion and such concentration that said solutions upon mixture react quickly to form an all-embracing gel, contacting and mixing said streams in said chamber under such conditions including confined high velocity flow that great turbulence and substantially instantaneous uniform mixture and gel formation are produced, and regulating the flow of said streams into said chamber to force the reaction product therefrom within a fraction of a second of said mixing.

5. In the manufacture of inorganic gels by interreaction of solutions, the steps comprising feeding under pressure into an enclosed reaction chamber separate and continuous high velocity confined streams of solutions of such concentration and character that they react quickly upon mixture to form an all-embracing gel, contacting and mixing said streams within said chamber under such conditions including confined high velocity flow that great turbulence and substantially instantaneous thorough mixture and gel formation within and throughout the mixture are produced, continuously ejecting a stream of the resulting reacted mixture from said chamber as a substantially completely formed all-embracing gel, effecting the above sequence of steps within a quarter of a second, and simultaneously and substantially continuously removing from the path of the last named stream accumulated and adherent gelatinous reaction product which tends to interfere with or impede movement of the same.

6. In the preparation of inorganic gels from solutions of such concentration and character that upon mixture they react quickly to form a gel having substantially no non-included water present, the process comprising forcing a confined stream of one reactant solution at high velocity under pressure into an enclosed reaction chamber, injecting a high velocity confined stream of another reactant solution under pressure into said chamber and into the stream of said first solution traversing said chamber under such conditions including confined high velocity flow that great turbulence and substantially instantaneous thorough mixture and gel formation are produced, ejecting the resulting gelatinous reaction product from said chamber within a second of said mixture, continuously removing from the path of the ejected mixture adherent gelatinous deposit tending to interfere with or impede its movement, and utilizing one of said confined streams of reactant solutions to provide motive power for said removal.

7. In apparatus for continuously producing solid reaction products from solutions, in combination, a mixing device adapted to effect rapid mixing of a plurality of streams of reactant solutions and provided with an orifice for delivering the mixed reactants, a cleaning member adapted and arranged to move within said orifice to remove solid reaction product from the walls of the same, mechanically operable means capable of providing reciprocating motion, and a guided linkage interconnecting said member and said means for holding said member in operating position and for transmitting the reciprocating motion of said means to predetermined and limited motion of said member.

8. In apparatus for continuously producing solid reaction products from solutions, in combination, a mixing nozzle adapted to effect rapid mixing of a plurality of streams of reactant solutions and provided with an orifice for delivering the mixed reactants, a pin insertable into said orifice for removing solid reaction product from the walls of the same, and reciprocating means mounted on said nozzle and connected to said pin for continuously and repeatedly imparting predetermined and limited motion to the latter.

9. In apparatus for continuously producing solid reaction products from solutions, in combination, a mixing nozzle adapted to effect intimate mixture of reactant solutions and provided with an opening for delivering the resulting mixture, a cleaning member insertable into said opening for removing solid reaction product from the walls of the same and disposed in operating position, and means for causing said member to move in wiping relation with said walls, said means comprising an eccentric mounted on said nozzle and a linkage connecting said member and said eccentric.

10. In apparatus for continuously producing solid reaction products from solutions, in combination, a mixing nozzle adapted to effect intimate mixture of reactant solutions and provided with an opening for delivering the resulting mixture, a cleaning member insertable in said opening adapted and arranged to reciprocate in a predetermined path within and beyond said opening, and means for reciprocating said member comprising an eccentric mounted on said nozzle and a guided reciprocating linkage connecting said eccentric and said member.

11. In apparatus for continuously producing solid reaction products from solutions, in combination, a mixing nozzle adapted to effect intimate mixture of reactant solutions and provided with an orifice for delivering the resulting mixture, a movable member extending into said orifice for removing solid reaction product from the latter, and means including a rotatably mounted eccentric and a connection between the same and said member adapted and arranged to provide predetermined and limited motion of the latter adjacent the walls of said orifice.

12. In apparatus for continuously producing solid reaction products from solutions, in combination, a mixing nozzle adapted to effect rapid mixing of a plurality of streams of reactant solutions and provided with an orifice for delivering the mixed reactants, a cleaning member for removing solid reaction product from the walls of said orifice, said member being arranged and adapted for continuous movement during the operation of said nozzle within a predetermined and limited path extending within said orifice, and mechanically operable means connected to said member for repeatedly moving the same over said path.

13. In apparatus for continuously producing solid reaction products from solutions, in combination, a mixing nozzle provided with a discharge orifice for mixed reactants, and mechanically operable cleaning means capable of movement within said orifice for removing solid reaction product from the walls of same, said means comprising a rotatable member, a cleaning member capable of insertion into said nozzle, and a connection between said members adapted and arranged to transmit motion of said rotatable member into motion of said cleaning member within a predetermined and limited path and to hold said cleaning member in position within said path.

14. In apparatus for continuously producing solid reaction products from solutions, in combination, a mixing nozzle provided with a discharge orifice for mixed reactants, a member adapted for insertion into said orifice for removing solid reaction product therefrom, and means for inducing wiping action between said member and the walls of said orifice, said means comprising a rotatable member mounted on the structure of said nozzle and a connection between it and said first named member arranged and adapted continuously and repeatedly to move the latter in a predetermined and limited path.

15. In apparatus for continuously producing solid reaction products from solution, in combination, a mixing device adapted to effect rapid and efficient mixture of reactant solutions provided with a mixing chamber and an opening for discharging mixed reactants therefrom, a movable member arranged and adapted to remove solid reaction product from the walls of said opening, rotatable means fastened to said device and means interconnecting said rotatable means and said member for moving the latter in a predetermined path and in wiping relation with the walls of said opening and holding the same within said path.

16. In apparatus for continuously producing solid reaction products from solutions, in combination, a mixing nozzle adapted to effect intimate mixture of reactant solutions and provided with an orifice for delivering the resulting mixture, means extending into said orifice for removing solid reaction product from the same, and rotatable means mounted on said nozzle and connected to said first named means thereby to provide for movement of the latter in an orbit within said orifice and adjacent the periphery of the same.

17. In apparatus for continuously producing solid reaction products from solutions, in combination, a mixing nozzle adapted to effect intimate mixture of reactant solutions and provided with an orifice for delivering the resulting mixture, a member smaller than the diameter of said orifice extending into the latter, and means for causing said member to move in an orbit within said orifice, said means comprising an eccentric and a linkage connecting said member and said eccentric.

18. In apparatus for continuously producing solid reaction products from solutions, in combination, a mixing nozzle adapted to effect intimate mixture of reactant solutions and provided with an orifice for delivering the resulting mixture, a pin of smaller diameter than said orifice extending into the latter, and means for causing said pin to continuously follow an orbit adjacent the periphery of said orifice, said means comprising an eccentric and a pivoted reciprocating linkage receiving said pin and connected to said eccentric.

19. In apparatus for continuously producing solid reaction products from solutions, in combination, a mixing device adapted to effect rapid and efficient mixture of individual streams of reactant solutions and provided with an orifice for delivering the resulting mixture, means adapted to move within said orifice for removing solid reaction product from the walls of the same, means capable of being rotated by a flowing stream of fluid disposed in one of said streams of reactant solution, and means interconnecting each of the aforesaid means adapted to transmit motion from said rotatable means to said first named means.

20. In apparatus for continuously producing solid reaction products from solutions, in combination, a mixing nozzle adapted to effect intimate mixture of reactant solutions and provided with an orifice for delivering the resulting mixture, means extending into said orifice for wiping solid reaction product from the walls of the latter, a turbine disposed in the stream of one of said reactant solutions, and means adapted to transmit motion to said wiping means joining the latter with said turbine.

21. In apparatus for continuously producing solid reaction products by interreaction of solutions in combination with a mixing nozzle providing separate channels for individual reactant solutions, an enclosed mixing chamber and an orifice for delivering mixed reactants from said chamber, means extending into said orifice and adapted upon rotation to remove solid reaction products from the walls of the same, a turbine disposed in the stream of reactant solution in one of said channels and adapted to be operated by said stream, and means connecting said turbine and said first named means thereby to transmit rotary motion from the former to the latter.

ALBERT G. PETERKIN.
HUBERT A. SHABAKER.

CERTIFICATE OF CORRECTION.

Patent No. 2,232,727. February 25, 1941.

ALBERT G. PETERKIN, ET AL.

It is hereby certified that error appears in the printed specification of the above numbered patent requiring correction as follows: Page 2, second column, line 14, after the word and comma "receiver," insert --such as a vat or tub, or upon--; page 3, first column, line 20, for "linkages" read --linkage--; page 5, first column, line 30, claim 3, for "gelationous" read --gelatinous--; and that the said Letters Patent should be read with this correction therein that the same may conform to the record of the case in the Patent Office.

Signed and sealed this 25th day of March, A. D. 1941.

(Seal)

Henry Van Arsdale,
Acting Commissioner of Patents.

CERTIFICATE OF CORRECTION.

Patent No. 2,232,727.　　　　　　　　　　　　　　February 25, 1941.

ALBERT G. PETERKIN, ET AL.

It is hereby certified that error appears in the printed specification of the above numbered patent requiring correction as follows: Page 2, second column, line 14, after the word and comma "receiver," insert --such as a vat or tub, or upon--; page 3, first column, line 20, for "linkages" read --linkage--; page 5, first column, line 30, claim 3, for "gelationous" read --gelatinous--; and that the said Letters Patent should be read with this correction therein that the same may conform to the record of the case in the Patent Office.

Signed and sealed this 25th day of March, A. D. 1941.

(Seal)　　　　　　　　　　　　　　　　　　　　　Henry Van Arsdale,
　　　　　　　　　　　　　　　　　　　　　　　Acting Commissioner of Patents.